United States Patent [19]

Sommer et al.

[11] Patent Number: 5,412,015
[45] Date of Patent: May 2, 1995

[54] SEALING COMPOSITIONS CONTAINING POLYMERS OF ETHYLENICALLY UNSATURATED MONOMERS

[75] Inventors: Oswin Sommer, Burghausenhen, Germany; Michel Dubois, F- Soisy Sous Montmorency, France; Norman Dorsch; Alois Strasser, both of Burghausen, Germany

[73] Assignee: Wacker-Chemie GmbH, Munich, Germany

[21] Appl. No.: 126,592

[22] Filed: Sep. 27, 1993

[30] Foreign Application Priority Data

Oct. 1, 1992 [DE] Germany .................. 42 33 077.7

[51] Int. Cl.⁶ .............................................. C08K 3/26
[52] U.S. Cl. .................................. 524/425; 524/427; 524/506
[58] Field of Search .................. 524/425, 427, 506

[56] References Cited

U.S. PATENT DOCUMENTS

| | | | |
|---|---|---|---|
| 4,368,290 | 1/1983 | Alberts et al. | 525/29 |
| 4,446,259 | 5/1984 | Vasta | 524/506 |
| 4,496,696 | 1/1985 | Kurita et al. | 525/479 |
| 4,757,106 | 7/1988 | Mayer et al. | 524/506 |
| 5,244,950 | 9/1993 | Schlarb et al. | 524/114 |

FOREIGN PATENT DOCUMENTS

| | | | |
|---|---|---|---|
| 0029947 | 6/1981 | European Pat. Off. | |
| 220841 | 6/1987 | European Pat. Off. | |
| 0343436 | 11/1989 | European Pat. Off. | |
| 2203155 | 10/1988 | United Kingdom | 524/506 |
| WO90/12065 | 10/1990 | WIPO | |

*Primary Examiner*—John C. Bleutge
*Assistant Examiner*—Mark D. Sweet
*Attorney, Agent, or Firm*—Martin Connaughton

[57] ABSTRACT

Sealing compositions containing dispersions of polymers of ethylenically unsaturated monomers comprising
(a) polymers of ethylenically unsaturated monomers,
(b) 0.1 to 5% by weight of branched organopolysiloxanes, based on the total weight of the sealing compositions,
(c) dispersing agent,
(d) filler and
(e) water.

6 Claims, No Drawings

SEALING COMPOSITIONS CONTAINING POLYMERS OF ETHYLENICALLY UNSATURATED MONOMERS

The invention relates to sealing compositions and more particularly to sealing compositions containing polymers of ethylenically unsaturated monomers and to a process for preparing the same.

BACKGROUND OF THE INVENTION

Sealing compositions which contain acrylate copolymer dispersions and organoaminosilanes, together with highly dispersed silicic acids, which have an improved intrinsic adhesion, resistance to water and storage stability are described in EP-A-220 841.

The known joint-sealing compositions which comprise polymers of ethylenically unsaturated monomers in the form of aqueous dispersions as binders have the serious disadvantage that their setting ability is extremely slow at low temperatures. At temperatures of about 0° C., vulcanization is delayed over a period of many hours. At minus temperatures, below 0° C., it can often take days until the paste crosslinks to a state which gives the matrix inner strength to the extent that it can also be subjected to load. These product properties restrict the use of this class of substance for many practical applications. Precisely in regions where low temperatures prevail for prolonged periods of time, these sealing compositions are exposed to an increased risk. If the sealing compositions have not set sufficiently and in the meantime they are exposed, for example, to rain, these products can be washed out by the rain, that is, the sealing composition dissolves and the binder and all the other materials are washed away.

At low temperatures, the evaporation of water is greatly reduced. In addition, if the relative atmospheric humidity of the environment is relatively high, the rate of crosslinking is, moreover, further delayed.

Therefore, it is an object of the present invention to provide sealing compositions which contain polymer dispersions obtained from ethylenically unsaturated monomers. Another object of the present invention is to provide polymer dispersions which set rapidly, especially at low temperatures. A further object of the present invention is to provide polymer dispersions which are resistant to rain a short time after application and adhere firmly to the substrate.

SUMMARY OF THE INVENTION

The foregoing objects and others which will become apparent from the foregoing description are accomplished in accordance with this invention, generally speaking, by providing sealing compositions comprising polymer dispersions containing (a) polymers of ethylenically unsaturated monomers, (b) 0.1 to 5% by weight of branched organopolysiloxanes, based on the total weight of the sealing composition, (c) dispersing agent, (d) filler and (e) water.

DESCRIPTION OF THE INVENTION

The addition of branched organopolysiloxanes (b) has the effect that the dispersions set faster, that is, the sealing compositions form a plastic surface which is inherently cohesive after only a short time, they can be subjected to mechanical load and they have a high resistance to early rain.

Preferred organopolysiloxanes (b) have, in addition to SiC-bonded hydrocarbon radicals, functional groups, such as, for example, $C_1$ to $C_6$-alkoxy groups or straight-chain or branched, optionally substituted aminoalkyl groups, such as

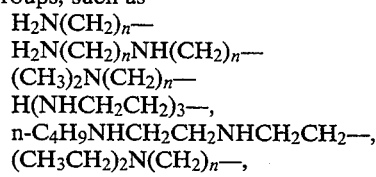

and

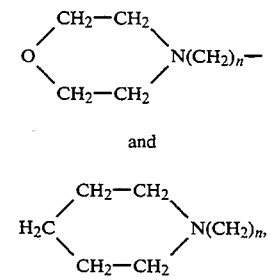

in which n has a value of from 1 to 12, and in particular from 2 to 4.

The adhesion of the sealing compositions of this invention, especially to absorbent porous substrates, is particularly good if the organopolysiloxanes (b) contain amino-functional groups. Organopolysiloxanes (b) of the general formula

in which R represents the same or different monovalent unsubstituted $C_1$ to $C_{18}$-hydrocarbon radicals bonded via SiC, or monovalent substituted $C_1$ to $C_{18}$-hydrocarbon radicals bonded via SiC, $R^1$ represents the same or different $C_1$ to $C_6$-alkoxy groups or aminoalkyl groups, a is 0, 1, 2 or 3, and an average of from 0.75 to 1.5, and b is 1, 2 or 3, with an average of from 0.2 to 2.0, are particularly preferred.

The radicals R preferably contain not more than 12 carbon atoms per radical. Examples of radicals R are alkyl radicals, such as the methyl, ethyl, n-propyl, iso-propyl, n-butyl, iso-butyl, tert-butyl, n-pentyl, iso-pentyl, neo-pentyl and tert-pentyl radicals; hexyl radicals, such as the n-hexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; alkenyl radicals, such as the vinyl and the allyl radicals; cycloalkyl radicals, such as cyclopentyl, cyclohexyl and cycloheptyl radicals and methylcyclohexyl radicals; aryl radicals, such as the phenyl and the naphthyl radicals; alkaryl radicals, such as o-, m- and p-tolyl radicals, xylyl radicals and ethylphenyl radicals; and aralkyl radicals, such as the benzyl radical and the α- and the β-phenylethyl radicals.

Examples of substituted radicals R are cyanoalkyl radicals, such as the β-cyanoethyl radical, and halogenated hydrocarbon radicals, for example haloalkyl radicals, such as the 3,3,3-trifluoro-n-propyl radical, the 2,2,2,2′, 2′, 2′-hexafluoroisopropyl radical and the heptafluoroisopropyl radical, and haloaryl radicals, such as the o-, m- and p-chlorophenyl radicals.

Preferably, at least 50% of the radicals R, and in particular at least 80% of the radicals R, are methyl radicals because of their availability.

Examples of $C_1$ to $C_6$-alkoxy groups are the methoxy, ethoxy, n-propoxy, iso-propoxy, n-butoxy, iso-butoxy, sec-butoxy and tert-butoxy group; and pentyloxy groups, such as the n-pentyloxy group, and hexyloxy groups, such as the n-hexyloxy group. The methoxy and ethoxy groups are particularly preferred.

Preferred aminoalkyl groups are the above-mentioned examples of aminoalkyl groups.

In the general formula (I), a is preferably an average of from 0.9 to 1.1 and b is preferably from 0.8 to 1.4, and more preferably from 1.0 to 1.2.

One organopolysiloxane (b), preferably one having the above formula, can be employed; however, it is also possible to employ a mixture of several organopolysiloxanes.

Organopolysiloxanes (b) of the general formula (I) which are particularly preferred are those in which $R^1$ represents a mixture of $C_1$ to $C_6$-alkoxy groups and aminoalkyl groups, preferably in a mol ratio of 1:10 to 10:1. If such organopolysiloxanes (b) are used, sealing compositions are obtained which set reasonably rapidly and have a particularly good intrinsic adhesion, especially to porous alkaline or metallic substrates.

Such organopolysiloxanes (b) can be prepared by subjecting silanes or siloxanes containing alkoxy groups and silanes or siloxanes containing aminoalkyl groups to a joint condensation reaction.

Preferred examples of organopolysiloxanes (b) of the general formula (I) are those which are obtained by reacting methyltrichlorosilane or phenyltrichlorosilane with ethanol in water, for example those of the empirical formula $CH_3Si(OC_2H_5)_{0.8}O_{1.1}$ or $C_6H_5Si(OC_2H_5)_{0.72}O_{1.14}$ or by reacting these reaction products with an amino-functional silane which contains, for example, the abovementioned aminoalkyl groups, preferably aminopropyltriethoxysilane, aminoethyltrimethoxysilane or aminopropyltrimethoxysilane.

Preferably, the organopolysiloxanes (b) and therefore organopolysiloxanes of formula (I) have a viscosity of 10 to 2000 mm$^2$/s at 25° C., and in particular from 15 to 200 mm$^2$/s at 25° C.

If the sealing compositions comprise less than 0.1% by weight of branched organopolysiloxanes, based on the total weight of the sealing compositions, crosslinking is slow. If the sealing compositions comprise more than 5% by weight of branched organopolysiloxanes, the sealing compositions start to crosslink prematurely during storage. The sealing compositions preferably comprise 0.3 to 1.5% by weight of branched organopolysiloxanes, based on the total weight of the sealing compositions.

The polymers of ethylenically unsaturated monomers (a) which can be employed according to the invention, include all the polymers of ethylenically unsaturated monomers which are suitable as binders for sealing compositions employed in the form of dispersions, and in particular the binders designated by the collective term acrylates.

Suitable polymers are homo- or copolymers of, for example, $\alpha,\beta$-unsaturated monocarboxylic acids having a carbon chain of between 3 and 10 carbon atoms, such as acrylic acid, methacrylic acid and crotonic and isocrotonic acid, and esters thereof with primary or secondary alcohols having 1 to 12 carbon atoms; $\alpha,\beta$-unsaturated dicarboxylic acids having 4 to 10 carbon atoms, such as, for example, maleic, fumaric and itaconic acid, and mono- and diesters thereof with primary or secondary alcohols having 1 to 12 carbon atoms; amides of the above carboxylic acids; vinyl esters with carboxylic acids containing 2 to 12 carbon atoms; nitrogen-containing, monoethyleneically unsaturated monomers, such as acrylonitrile, acrylamide, methacrylamide, N-methylolacrylamide, N-methylolmethacrylamide, allyl N-methylolcarbamate; ethylenically unsaturated monomers containing carbonyl groups, such as diacetoneacrylamide and -methacrylamide, acrolein, formylstyrene, diacetone acrylate, acetonyl acrylate, 2-hydroxypropyl acrylate or acetoacetate and vinyl alkyl ketones, for example, vinyl methyl ketone, vinyl ethyl ketone and vinyl isobutyl ketone.

Preferred acrylic acid esters contain from 4 to 8 carbon atoms in the alcohol radical.

Examples of primary or secondary alcohols having 1 to 12 carbon atoms which can be esterified with $\alpha,\beta$-unsaturated mono- and dicarboxylic acids are methanol, ethanol, n-propanol, iso-propanol, n-butanol, iso-butanol, tert-butanol, n-hexanol, 2-ethylhexanol, cyclohexanol, decanol and Lauryl alcohol.

Preferred vinyl esters are vinyl butyrate, vinyl decanoate, vinyl laurate and, in particular, vinyl acetate and vinyl propionate.

The olefins, such as ethylene, propylene, butylene and butadiene; vinyl halides and vinylidene halides, such as, for example, vinyl fluoride, vinylidene fluoride and vinylidene chloride, and vinylaromatics such as styrene, are suitable examples of ethyleneically unsaturated comonomers together with the above mentioned monomers.

If ethylenically unsaturated monomers which are suitable only as comonomers are used, their amount should not be in excess of 50% by weight, preferably not more than 20% by weight, based on the total weight of the monomer mixture of component (a).

Preferred components (a) are homo- or copolymers of acrylic acid and methacrylic acid and esters thereof from primary or secondary alcohols having 1 to 12 carbon atoms with, where appropriate, other ethylenically unsaturated monomers, such as olefins or vinyl esters having 2 to 12 carbon atoms.

The polymers (a) of ethylenically unsaturated monomers are preferably prepared by polymerization of the monomers in an aqueous emulsion at temperatures generally employed using conventional dispersing agents and the conventional polymerization initiators which form free radicals, in accordance with the monomer feed process or emulsion feed process described in Ullmann's Encyclopädie der technischen Chemie (Ullmann's Encyclopedia of Industrial Chemistry), 4th Edition, Verlag Chemie, Weinheim, Vol. 19, Chapter 5.4. The dispersions, prepared by emulsion polymerization, of the polymers (a) of ethylenically unsaturated monomers preferably comprise from 40 to 80% by weight, and more preferably from 55 to 70% by weight, of the polymers based on the weight of the sealing composition.

The dispersing agents (c) which can be employed in this invention are known per se. They include all the dispersing agents which have been or could have been employed heretofore in preparing dispersions of polymers of ethylenically unsaturated monomers.

Examples of dispersing agents (c) are protective colloids, such as polyvinyl alcohol, which optionally contains up to 40 mol % of acetyl groups, gelatin and cellulose derivatives, such as watersoluble methylcellulose, ammonium and alkali metal salts of polyacrylates, ammonium and alkali metal polyphosphates and surfaceactive substances, such as emulsifiers.

Anionic emulsifiers which are particularly suitable are:

1. Alkyl sulfates, particularly those having a chain length of from 8 to 18 carbon atoms, and alkyl ether-sulfates having from 8 to 18 carbon atoms in the hydrophobic radical and from 1 to 40 ethylene oxide (EO) or propylene oxide (PO) units.
2. Sulfonates, particularly alkylsulfonates having from 8 to 18 carbon atoms, alkylarylsulfonates having from 8 to 18 carbon atoms, taurides, and esters and half-esters of sulfosuccinic acid with monohydric alcohols or alkylphenols having from 4 to 15 carbon atoms; these alcohols or alkylphenols can optionally also be ethoxylated with from 1 to 40 EO units.
3. Alkali metal salts and ammonium salts of carboxylic acids having from 8 to 20 carbon atoms in the alkyl, aryl, alkaryl or aralkyl radical.
4. Phosphoric acid partial esters and alkali metal salts and ammonium salts thereof, particularly alkyl and alkaryl phosphates having from 8 to 20 carbon atoms in the organic radical and alkyl ether- and alkaryl ether-phosphates having from 8 to 20 carbon atoms in the alkyl or alkaryl radical and from 1 to 40 EO units.

Particularly suitable nonionic emulsifiers are:

1. Alkyl polyglycol ethers, preferably those having from 8 to 40 EO units and alkyl radicals having from 8 to 20 carbon atoms.
2. Alkylaryl polyglycol ethers, preferably those having from 8 to 40 EO units and 8 to 20 carbon atoms in the alkyl and aryl radicals.
3. Ethylene oxide/propylene oxide (EO/PO) block copolymers, preferably those having from 8 to 40 EO or PO units.
4. Fatty acids having from 6 to 24 carbon atoms.
5. Naturally occurring substances and derivatives thereof, such as lecithin, lanolin, saponins and cellulose; and cellulose alkyl ethers and carboxyalkyl celluloses, in which the alkyl groups in each case have up to 4 carbon atoms.
6. Linear organo(poly)siloxanes containing polar groups, and in particular those with alkoxy groups having up to 24 carbon atoms and/or up to 40 EO and/or PO groups.

Particularly suitable cationic emulsifiers are:

1. Salts of primary, secondary and tertiary fatty amines having from 8 to 24 carbon atoms with acetic acid, sulfuric acid, hydrochloric acid and phosphoric acids.
2. Quaternary alkylbenzylammonium salts, particularly those in which the alkyl groups have from 6 to 24 carbon atoms, especially the halides, sulfates, phosphates and acetates.
3. Alkylpyridinium, alkylimidazolinium and alkyloxazolinium salts, and in particular those in which the alkyl chain has up to 18 carbon atoms, especially the halides, sulfates, phosphates and acetates.

The dispersing agents are preferably employed in amounts of from 1 to 20% by weight, and in particular from 3 to 10% by weight, based on the weight of the sealing composition.

The fillers (d) which can be employed in this invention include all the fillers which have been or could have been employed heretofore in preparing sealing compositions. Examples of fillers are non-reinforcing fillers, that is, fillers having a BET surface area of up to 50 $m^2/g$, such as quartz flour, chalk, talc, dolomite, kaolin, diatomaceous earth, calcium silicate, zirconium silicate, zeolites, montmorillonites, such as bentonites, metal oxide powders, such as the oxides of aluminum, titanium, iron or zinc and mixed oxides thereof, barium sulfate, calcium carbonate, gypsum, silicon nitride, silicon carbide, boron nitride, glass powder and powdered plastics. Other fillers which may be employed are reinforcing fillers, that is fillers having a BET surface area of more than 50 $m^2/g$, such as pyrogenically prepared silicic acid, precipitated silicic acid and silicon/aluminum mixed oxides of high BET surface area; and fibrous fillers, such as asbestos and fibers of plastics. One type of filler can be employed, however, it is also possible to employ a mixture of at least two fillers.

The sealing compositions of this invention preferably comprise 30 to 70% by weight, and in particular from 45 to 60% by weight, of fillers (d) based on the weight of the sealing composition.

In addition to the above mentioned constituents, the sealing compositions of this invention can also contain other additives which are generally employed in sealing compositions, such as pigments, thickening agents, insecticides, fungicides, foam suppressants and light stabilizers.

Examples of suitable pigments are titanium dioxide and iron oxide. These pigments may be employed in the sealing compositions of this invention in amounts of, for example, from 0.2 to 5% by weight based on the weight of the sealing composition.

Examples of suitable plasticizers which may be employed in the sealing compositions of this invention are esters of phthalic acid or adipic acid, low molecular weight polyisobutanes and polyalkyl phenyl ethers. The plasticizers may be employed in the sealing compositions in amounts of, for example, from 5 to 20% by weight based on the weight of the sealing composition.

In the preparation of the sealing compositions of this invention, the branched organopolysiloxanes (b) are preferably added to the polymers (a) of ethylenically unsaturated monomers, immediately after the preparation of polymers (a). The polymers (a) are preferably employed as a dispersion. The dispersing agent (c), filler (d) and water (e) and if appropriate the additives can be admixed in any desired sequence. Mixing is carried out in commercially available mixing devices, for example in a vacuum planetary mixer.

The sealing compositions of this invention can be used inside or outside, for example on wood and metals, but especially on brick walls, concrete, masonry plastered with mortar based on lime and sand, natural stones and other building materials. They can be applied in any desired manner, preferably by spraying.

In the examples described below, all the viscosity data are based on a temperature of 25° C. Unless otherwise specified, the examples are carried out at the pressure of the surrounding atmosphere, that is, under about 1000 hPa, and at room temperature (RT), that is, at about 20° C., or at a temperature which is attained when the reactants are brought together at room temperature without additional heating or cooling. All parts and percentages are by weight, unless otherwise specified.

Amine number = number of ml of 1N HCl required for neutralization of 1 g of substance.

Preparation of the branched organopolysiloxanes having functional groups

About 64.0 parts by weight of a partial hydrolyzate of methyltriethoxysilane having a molar ratio of methyl groups/ethoxy groups of 55/45 and a viscosity of 24.5 mm$^2$/sec at 25° C., 27.0 parts by weight of aminopropyltriethoxysilane, 9.0 parts by weight of ethanol and 0.05 part by weight of ethanolic KOH were boiled under reflux at 85° C. for 3 hours. The mixture was then neutralized with hydrochloric acid, the resulting salt was filtered off and the alcohol was distilled off.

The resultant product had a viscosity which was between 20 and 40 mm$^2$/s and the amine number was just about 1.

EXAMPLE 1

The following materials were added to a commercially available plasticizer-free acrylate copolymer dispersion containing 90% of 2-ethylhexyl acrylate and having a solids content of 60% by weight, a viscosity of 5000 mPa.s (measured by the Brookfield method at 20 revolutions/minute and 23° C.) and a pH of 5 (Vinnapa ® Dispersion AF 75 from Wacker-Chemie GmbH, Munich), in a vacuum planetary mixer. After homogenization of the mixture, mixing was continued in the evacuated planetary mixer for an additional 10 to 20 minutes, in order to ensure that the sealing composition was free from inclusion of air.

A joint-sealing composition was prepared containing the following ingredients:

| Material | Percent |
| --- | --- |
| Vinnapas ® dispersion AF 75 | 40.50 |
| Dispersing agent (wetting agent - based on sodium polyphosphate) | 0.25 |
| Preservative | 0.10 |
| Ammonia | 0.10 |
| Titanium dioxide | 2.30 |
| Calcium carbonate (chalk) | 49.00 |
| Polypropylene glycol alkylphenyl ether | 7.00 |
| Branched organopolysiloxane having amino-functional groups | 0.75 |
|  | 100.00 |

Comparison Example

The procedure of Example 1, was repeated except that the branched organopolysiloxane was omitted. An additional 0.75% by weight of chalk was added.

| Material | Percent |
| --- | --- |
| Vinnapas ® dispersion AF 75 | 40.50 |
| Dispersing agent (wetting agent - based on sodium polyphosphate) | 0.25 |
| Preservative | 0.10 |
| Ammonia | 0.10 |
| Titanium dioxide | 2.30 |
| Calcium carbonate (chalk) | 49.75 |
| Polypropylene glycol alkylphenyl ether | 7.00 |
|  | 100.00 |

Testing of the intrinsic adhesion

The improvement in the adhesion of the sealing composition was determined with the aid of the "caterpillar strip" test. The compositions were applied in the form of strips of sealing composition to selected substrates, aluminum, glass and concrete surfaces. After complete hardening (storage at a normal temperature of 23° C. and 50% relative atmospheric humidity), attempts were made to peel the compositions away from the substrate. The results are shown in Table I.

Evaluation

+ good adhesion, cohesive cracking (the sealing material cracks in itself)
− poor adhesion (adhesion cracking)
φ partial adhesion, zone adhesion

TABLE I

|  | Example 1 | Comparison Example |
| --- | --- | --- |
| Aluminum | + | − |
| Glass | + | φ |
| Concrete | + | − |

Testing of the resistance to early rain at RT

The acrylate compositions were introduced into U-shaped tracks such that the surface area was 50 cm$^2$, and were kept at 23° C. and 50% atmospheric humidity for 1 hour and exposed to a jet of water at predetermined times. The sprinkling time was in each case 15 minutes. The amount of water was 300 l/minute and the angle of impact of the water was set at 45° C. The weight loss, based on the weight before sprinkling, is shown in Table II.

TABLE II

|  | Example 1 | Comparison Example |
| --- | --- | --- |
| Drying time at 25° C. |  |  |
| 10 minutes | <8% | >70% |
| 30 minutes | <2% | >65% |
| 60 minutes | — | >40% |
| 90 minutes | — | >40% |
| 4 hours | — | >40% |
| (Data in percent by weight) |  |  |

Testing of the resistance to early rain at low temperature of +5° C.

The acrylate compositions were introduced into U-shaped tracks again and stored in a refrigerator at +5° C. Samples were taken after predetermined intervals of time and sprinkled as above. The sprinkling time was likewise 15 minutes. The results are shown in Table III.

TABLE III

|  | Example 1 | Comparison Example |
| --- | --- | --- |
| Drying time at 25° C. |  |  |
| 12 hours | >50% | 100% |
| 24 hours | 12% | 100% |
| 48 hours | — | 100% |
| 72 hours | — | 95% |
| 96 hours | — | 88% |
| (Data in percent by weight) |  |  |

What is claimed is:

1. A sealing composition comprising a dispersion of
   (a) 40 to 80% by weight of a polymer obtained from ethylenically unsaturated monomers,
   (b) 0.1 to 5% by weight of a branched organopolysiloxane containing at least one aminoalkyl group, based on the total weight of the sealing composition,
   (c) 1 to 20% by weight of a dispersing agent, (d) 30 to 70% by weight of a filler and
(e) water.

2. The sealing composition of claim 1, wherein organopolysiloxane (b) has the general formula $$R_a Si(R^1)_b O_{\frac{4-a-b}{2}} \qquad (I)$$

in which R is a monovalent unsubstituted $C_1$ to $C_{18}$-hydrocarbon radical bonded via SiC or a monovalent substituted $C_1$ to $C_{18}$-hydrocarbon radical bonded via SiC, $R^1$ is a $C_1$ to $C_6$-alkoxy group and/or an aminoalkyl group, a is 0, 1, 2 or 3, with an average of from 0.75 to 1.5, and b is 1, 2 or 3, with an average of from 0.2 to 2.0.

3. The sealing composition of claim 2, wherein $R^1$ represents a $C_1$ to $C_6$-alkoxy group and an aminoalkyl group.

4. The sealing composition of claim 1, wherein (a) is a homo- or copolymer of acrylic acid or methacrylic acid or an ester thereof from a primary or secondary alcohol having from 1 to 12 carbon atoms.

5. A process for preparing the sealing composition of claim 1, which comprises adding the branched organopolysiloxane (b) to the polymer obtained from an ethylenically unsaturated monomer (a), immediately after the preparation of polymer (a).

6. The sealing composition of claim 1, wherein (a) is a copolymer of acrylic acid or methacrylic acid or an ester thereof from a primary or secondary alcohol having from 1 to 12 carbon atoms and another ethylenically unsaturated monomer.

* * * * *